United States Patent
Tang (10) Patent No.: US 11,706,724 B2
(45) Date of Patent: Jul. 18, 2023

(54) WIRELESS COMMUNICATION METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 51 days.

(21) Appl. No.: 16/915,144

(22) Filed: Jun. 29, 2020

(65) Prior Publication Data

US 2020/0389860 A1    Dec. 10, 2020

Related U.S. Application Data

(63) Continuation of application No. PCT/CN2017/120129, filed on Dec. 29, 2017.

(51) Int. Cl.
H04W 56/00    (2009.01)

(52) U.S. Cl.
CPC ..... *H04W 56/001* (2013.01); *H04W 56/0055* (2013.01)

(58) Field of Classification Search
None
See application file for complete search history.

(56) References Cited

U.S. PATENT DOCUMENTS

| 2016/0056935 | A1  | 2/2016  | Damnjanovic et al. |
| 2017/0251442 | A1  | 8/2017  | Kalhan |
| 2018/0007708 | A1  | 1/2018  | Ke et al. |
| 2020/0163037 | A1* | 5/2020  | Zheng ............... H04W 56/0015 |
| 2020/0229017 | A1* | 7/2020  | Liu .................... H04W 36/0094 |
| 2020/0280939 | A1* | 9/2020  | Pang .................. H04W 56/001 |
| 2020/0314777 | A1* | 10/2020 | Liu ....................... H04W 72/04 |

(Continued)

FOREIGN PATENT DOCUMENTS

| CN | 105991211 A | 10/2016 |
| CN | 105992347 A | 10/2016 |
| CN | 106304094 A | 1/2017 |

(Continued)

OTHER PUBLICATIONS

Office Action of the Indian application No. 202027031841, dated Aug. 31, 2021. 8 pages with English translation.

(Continued)

*Primary Examiner* — Saad Khawar
(74) *Attorney, Agent, or Firm* — Perkins Coie LLP (57) ABSTRACT

A wireless communication method and device are provided. The method includes: a network device detecting, on the basis of M candidate time positions of a synchronous signal block, whether a carrier on an unlicensed frequency band is idle, the M candidate time positions being at least part of L candidate time positions of the synchronous signal block, the L candidate time positions being all the candidate time positions within a single transmission period of the synchronous signal block; according to a detection result, the network device sending the synchronous signal block at at least one of the M candidate time positions.

20 Claims, 6 Drawing Sheets

(56) References Cited

U.S. PATENT DOCUMENTS

2020/0322957 A1* 10/2020 Tomeba ............... H04L 5/0051

FOREIGN PATENT DOCUMENTS

| CN | 106452704 | A  | 2/2017  |
|----|-----------|----|---------|
| EP | 3251433   | A1 | 12/2017 |
| EP | 3258721   | A1 | 12/2017 |
| EP | 3251433   | A4 | 1/2018  |
| JP | 2017528985| A  | 9/2017  |
| RU | 2638030   | C1 | 12/2017 |
| WO | 2016069938| A1 | 5/2016  |
| WO | 2016122231| A1 | 8/2016  |

OTHER PUBLICATIONS

International Search Report in the international application No. PCT/CN2017/120129, dated Apr. 13, 2018.
SHARP: "Indication of actually transmitted SS blocks", 3GPP Draft; R1-1711232, 3rd Generation Partnership Project(3GPP), Mobile Competence Centre; 650, Route Des Lucioles; F-06921 Sophia-Antipolis Cedex; France, vol. RAN WG1, No. Qingdao; May 27, 2017-May 30, 2017, Jun. 26, 2017 (Jun. 26, 2017), XP051300430, Retrieved from the Internet:URL: http://www.3gpp.org/ftp/Meetings_3GPP_SYNC/RAN1/Docs/ [retrieved on Jun. 26, 2017] pp. 2,3.
Intel Corporation: "SS block composition", 3GPP Draft; R1-1707337 Intel SS Block Composition, 3rd Generation Partnership Project (3GPP), Mobile Competence Centre; 650, Route Des Lucioles; F-06921 Sophia-Antipolis Cedex; France, vol. RAN WG1,No. Hangzhou; May 15, 2017-May 19, 2017, May 14, 2017 (May 14, 2017), XP051272550, Retrieved from the Internet: URL:http://www.3gpp.org/ftp/Meetings_3GPP_SYNC/RAN1/Docs/ [retrieved on May 14, 2017] section 1 and 3.
First Office Action of the Russia application No. 2020124898, dated Apr. 30, 2021.
Supplementary European Search Report in the European application No. 17936480.7, dated Mar. 4, 2021.
Written Opinion of the International Search Authority in the international application No. PCT/CN2017/120129, dated Apr. 13, 2018.
At&T: "NR SS block and burst set composition", 3GPP Draft; R1-1710412 NR SS Design-Burst Set Composition, 3rd Generation Partnership Project (3GPP), Mobile Competence Centre; 650, Route Des Lucioles; F-06921 Sophia-Antipolis Cedex; France, vol. RAN WG1, No. Qingdao, China Jun. 27, 2017-Jun. 30, 2017, (Jun. 17, 2017), XP051305011, Section 2.
Partial Supplementary European Search Report in the European application No. 17936480.7, dated Nov. 30, 2020.
First Office Action of the Japanese application No. 2020-535220, dated Nov. 30, 2021. 6 pages with English translation.
Decision of Refusal of the Japanese application No. 2020-535220, dated Jul. 22, 2022. 4 pages with English Translation.
First Written Opinion of the Singaporean application No. 11202006279Y, dated May 20, 2022. 9 pages.
Second Office Action of the Korean application No. 10-2020-7022115, dated Jun. 29, 2022. 6 pages with English Translation.
Decision of Refusal of the Korean application No. 10-2020-7022115, dated Dec. 14, 2022. 6 pages with English translation.
Reconsideration Report of the Japanese application No. 2020-535220, dated Jan. 27, 2023. 5 pages with English translation.
First Office Action after Re-examination of the Korean application No. 10-2020-7022115, dated Apr. 12, 2023.

* cited by examiner

WIRELESS COMMUNICATION METHOD, NETWORK DEVICE AND TERMINAL DEVICE

CROSS-REFERENCE TO RELATED APPLICATIONS

The present disclosure is a U.S. continuation application of International Application No. PCT/CN2017/120129, filed on Dec. 29, 2017. The contents of this application are incorporated herein by reference in its entirety.

BACKGROUND

In a New Radio (NR) system, a network device may send a Synchronization Signal Block (SS block or SSB) to a terminal device, and the SS block may include a Primary Synchronization Signal (PSS), a Secondary Synchronization Signal (SSS) and a Physical Broadcasting Channel (PBCH).

In the NR system, the network device may communicate with the terminal device through an unlicensed band.

How to transmit an SS block in an unlicensed band in an NR system is a problem urgent to be solved.

SUMMARY

Embodiments of the application relate to the field of communication, and more particularly to a wireless communication method, a network device and a terminal device.

The embodiments of the application provide a wireless communication method and device, which may implement transmission of an SS block in an unlicensed band.

A first aspect provides a wireless communication method, which may include the following operation.

A network device monitors whether a carrier in an unlicensed band is idle based on M candidate time positions for an SS block, the M candidate time positions being at least part of L candidate time positions of the SS block and the L candidate time positions being all candidate time positions in a single sending cycle of the SS block, for acquisition of candidate time position(s) where the SS block is sent.

A second aspect provides a wireless communication method, which may include the following operations.

A terminal device determines M candidate time positions for an SS block, the M candidate time positions being at least part of L candidate time positions of the SS block, the L candidate time positions being all candidate time positions in a single sending cycle of the SS block.

The terminal device performs signal reception on a carrier of an unlicensed band based on the M candidate time positions to acquire the SS block.

A third aspect provides a network device including a processor and a transceiver. the processor is configured to monitor, based on M candidate time positions for a Synchronization Signal (SS) block, whether a carrier in an unlicensed band is idle, the M candidate time positions being at least part of in L candidate time positions for the SS block and the L candidate time positions being all candidate time positions in a single sending cycle of the SS block.

A fourth aspect provides a terminal device including a processor and a transceiver. The processor is configured to determine M candidate time positions for a Synchronization Signal (SS) block, the M candidate time positions being at least part of L candidate time positions of the SS block, the L candidate time positions being all candidate time positions in a single sending cycle of the SS block. The transceiver is configured to perform, based on the M candidate time positions, signal reception on a carrier of an unlicensed band to acquire the SS block.

BRIEF DESCRIPTION OF THE DRAWINGS

In order to describe the technical solutions of the embodiments of the application more clearly, the drawings required to be used in descriptions about the embodiments or a conventional art will be simply introduced below. It is apparent that the drawings described below are only some embodiments of the application. Other drawings may further be obtained by those of ordinary skill in the art according to these drawings without creative work.

DETAILED DESCRIPTION

A first aspect provides a wireless communication method, which may include the following operation.

A network device monitors whether a carrier in an unlicensed band is idle based on M candidate time positions for an SS block, the M candidate time positions being at least part of L candidate time positions of the SS block and the L candidate time positions being all candidate time positions in a single sending cycle of the SS block, for acquisition of candidate time position(s) where the SS block is sent.

Therefore, in the embodiments of the application, the network device monitors whether the carrier in the unlicensed band is idle based on the M candidate time positions in the L candidate time positions for the SS block to acquire the candidate time position(s) where the SS block is sent, and a terminal device may implement signal reception on the carrier of the unlicensed hand based on the M candidate time positions to acquire the SS block. In such a manner, the SS block is not required to be transmitted at a fixed candidate time position, and transmission of the SS block on the carrier of the unlicensed band may be implemented.

In combination with the first aspect, in a possible implementation mode of the first aspect, the network device may send the SS block at at least one of the M candidate time positions according to a monitoring result.

In combination with the first aspect, in a possible implementation mode of the first aspect, the network device may detect that the carrier in the unlicensed band is idle before each of the at least one candidate time position.

In combination with the first aspect or any abovementioned possible implementation mode thereof, in a possible implementation mode of the first aspect, the operation that the network device monitors whether the carrier in the unlicensed hand is idle based on the M candidate time positions for the SS block may include the following operation.

Whether the carrier in the unlicensed band is idle is sequentially monitored before each candidate time position in the M candidate time positions until it is detected that the carrier in the unlicensed band is idle before N candidate time positions or until monitoring of the carrier in the unlicensed band is completed before the last candidate time position in the M candidate time positions, N being the number of candidate time positions where the network device expects to send the SS block and N being a positive integer less than or equal to M.

In combination with the first aspect or any abovementioned possible implementation mode thereof, in a possible implementation mode of the first aspect, when the carrier is monitored before each candidate time position, a first beam direction in which monitored by the network device may be consistent with a second beam direction, the second beam direction being an expected sending beam direction for sending the SS block at each of the candidate time positions.

In combination with the first aspect or any abovementioned possible implementation mode thereof, in a possible implementation mode of the first aspect, the method may further include the following operation.

The network device sends first indication information, the first indication information being configured to indicate the M candidate time positions or a value of M and/or indicate a value of N, N being the number of the candidate time positions where the network device expects to send the SS block and N being a positive integer less than or equal to M.

In combination with the first aspect or any abovementioned possible implementation mode thereof, in a possible implementation mode of the first aspect, the operation that the network device sends the first indication information may include the following operation.

The network device sends the first indication information through the carrier in the unlicensed band.

In combination with the first aspect or any abovementioned possible implementation mode thereof, in a possible implementation mode of the first aspect, the operation that the network device sends the first indication information may include the following operation.

The network device sends the first indication information through a carrier in a licensed band.

In combination with the first aspect or any abovementioned possible implementation mode thereof, in a possible implementation mode of the first aspect, the operation that the network device sends the first indication information through the carrier in the licensed band may include the following operation.

The network device sends the first indication information by use of a carrier corresponding to a primary cell in the licensed band.

The carrier in the unlicensed band may be a carrier corresponding to a secondary cell of the network device in the band.

In combination with the first aspect or any abovementioned possible implementation mode thereof, in a possible implementation mode of the first aspect, the first indication information may be carried in Remaining Minimum System Information (RMSI); or, the first indication information may be carried in Radio Resource Control (RRC) signaling.

In combination with the first aspect or any abovementioned possible implementation mode thereof, in a possible implementation mode of the first aspect, the method may further include the following operation.

The network device sends second indication information at a time position after the at least one candidate time position.

The second indication information may be configured to indicate a pattern of candidate time position(s) where the SS block is practically sent or the number of the candidate time position(s) where the SS block is practically sent.

In combination with the first aspect or any abovementioned possible implementation mode thereof, in a possible implementation mode of the first aspect, the second indication information may indicate, by indicating whether the SS block is sent at each candidate time position in the M candidate time positions, the pattern of the candidate time position(s) where the SS block is practically sent.

In combination with the first aspect or any abovementioned possible implementation mode thereof, in a possible implementation mode of the first aspect, the second indication information may be configured to indicate the pattern of the candidate time position(s) where the SS block is practically sent.

Each of the at least one candidate time position may correspond to a respective one of at least one sending beam according to an arrangement sequence.

In combination with the first aspect or any abovementioned possible implementation mode thereof, in a possible implementation mode of the first aspect, the operation that the network device sends the second indication information at a time position after the at least one candidate time position may include the following operation.

The network device sends the second indication information through the carrier in the unlicensed band at a time position after the at least one candidate time position.

In combination with the first aspect or any abovementioned possible implementation mode thereof, in a possible implementation mode of the first aspect, the operation that the network device sends the second indication information at a time position after the at least one candidate time position may include the following operation.

The network device sends the second indication information through the carrier in the licensed hand at a time position after the at least one candidate time position.

In combination with the first aspect or any abovementioned possible implementation mode thereof, in a possible implementation mode of the first aspect, the operation that the network device sends the second indication information through the carrier in the licensed band may include the following operation.

The network device sends the second indication information by use of the carrier corresponding to the primary cell in the licensed band.

The carrier in the unlicensed band may be the carrier corresponding to the secondary cell of the network device in the band.

In combination with the first aspect or any abovementioned possible implementation mode thereof, in a possible implementation mode of the first aspect, when there are multiple candidate time positions where the SS block is practically sent, different sending beams may be adopted for sending the SS block at any two of the multiple candidate time positions.

In combination with the first aspect or any abovementioned possible implementation mode thereof, in a possible implementation mode of the first aspect, the operation that the network device monitors whether the carrier in the unlicensed band is idle or not based on the M candidate time positions configured to send the SS block may include the following operation.

The network device periodically monitors the carrier in the unlicensed band according to a sending cycle for the SS block and the M candidate time positions.

In combination with the first aspect or any abovementioned possible implementation mode thereof, in a possible implementation mode of the first aspect, the method may further include the following operation.

The network device performs rate matching for a channel or signal different from the SS block based on a hypothesis that the M candidate time positions are occupied by the SS block.

A second aspect provides a wireless communication method, which may include the following operations.

A terminal device determines M candidate time positions for an SS block, the M candidate time positions being at least part of L candidate time positions of the SS block, the L candidate time positions being all candidate time positions in a single sending cycle of the SS block.

The terminal device performs signal reception on a carrier of an unlicensed band based on the M candidate time positions to acquire the SS block.

Therefore, in the embodiments of the application, the network device monitors whether the carrier in the unlicensed band is idle based on the M candidate time positions in the L candidate time positions for the SS block to acquire candidate time position(s) where the SS block is sent, and a terminal device may implement signal reception on the carrier of the unlicensed hand based on the M candidate time positions to acquire the SS block. In such a manner, the SS block is not required to be transmitted at a fixed candidate time position, and transmission of the SS block on the carrier of the unlicensed band may be implemented.

In combination with the second aspect, in a possible implementation mode of the second aspect, the operation that the terminal device performs signal reception on the carrier of the unlicensed hand based on the M candidate time positions may include the following operation.

The detection is sequentially performed for the SS block at each candidate time position in the M candidate time positions on the carrier of the unlicensed band until the SS block is acquired at N candidate time positions or until the detection for the SS block is performed at the last candidate time position in the M candidate time positions, N being the number of candidate time positions where a network device expects to send the SS block and N being a positive integer less than or equal to M.

In combination with the second aspect or any abovementioned possible implementation mode thereof, in a possible implementation mode of the second aspect, the method may further include the following operation.

The terminal device receives first indication information sent by the network device, the first indication information being configured to indicate the M candidate time positions or a value of M and/or indicate a value of N, N being the number of the candidate time positions where the network device expects to send the SS block and N being a positive integer less than or equal to M.

In combination with the second aspect or any abovementioned possible implementation mode thereof, in a possible implementation mode of the second aspect, the operation that the terminal device receives the first indication information sent by the network device may include the following operation.

The terminal device receives the first indication information sent by the network device on the carrier in the unlicensed band.

In combination with the second aspect or any abovementioned possible implementation mode thereof, in a possible implementation mode of the second aspect, the operation that the terminal device receives the first indication information sent by the network device may include the following operation.

The terminal device receives the first indication information sent by the network device on a carrier in a licensed band.

In combination with the second aspect or any abovementioned possible implementation mode thereof, in a possible implementation mode of the second aspect, the operation that the terminal device receives the first indication information sent by the network device on the carrier in the licensed band may include the following operation.

The terminal device receives the first indication information sent by the network device on a carrier corresponding to a primary cell in the licensed band.

The carrier in the unlicensed band may be a carrier corresponding to a secondary cell of the network device in the band.

In combination with the second aspect or any abovementioned possible implementation mode thereof, in a possible implementation mode of the second aspect, the first indication information may be carried in RMSI; or, the first indication information may be carried in RRC signaling.

In combination with the second aspect or any abovementioned possible implementation mode thereof, in a possible implementation mode of the second aspect, the method may further include the following operation.

The terminal device receives second indication information sent by the network device at a time position after at least one candidate time position, the at least one candidate time position being at least one candidate time position where the SS block is practically sent.

The second indication information may include a pattern of the at least one candidate time position where the SS block is practically sent or the number of the at least one candidate time position where the SS block is practically sent.

In combination with the second aspect or any abovementioned possible implementation mode thereof, in a possible implementation mode of the second aspect, the second indication information may indicate, by indicating whether the SS block is sent at each candidate time position in the M candidate time positions, the pattern of the at least one candidate time position where the SS block is practically sent.

In combination with the second aspect or any abovementioned possible implementation mode thereof, in a possible implementation mode of the second aspect, the second indication information may be configured to indicate the pattern of the at least one candidate time position where the SS block is practically sent, and each of the at least one candidate time position may correspond to a respective one of at least one sending beam according to an arrangement sequence.

The method may further include the following operation.

The terminal device determines the sending beam adopted by the network device to send the SS block at each candidate time position in the at least one candidate time position according to a time sequence of the at least one candidate time position where the SS block is practically sent.

In combination with the second aspect or any abovementioned possible implementation mode thereof, in a possible implementation mode of the second aspect, the operation that the terminal device receives the second indication information sent by the network device at a time position after the at least one candidate time position may include the following operation.

The terminal device receives the second indication information sent by the network device at a time position after the at least one candidate time position on the carrier of the unlicensed band.

In combination with the second aspect or any abovementioned possible implementation mode thereof, in a possible implementation mode of the second aspect, the operation that the terminal device receives the second indication information sent by the network device at a time position after the at least one candidate time position may include the following operation.

The terminal device receives the second indication information sent by the network device at a time position after the at least one candidate time position on the carrier of the licensed band.

In combination with the second aspect or any abovementioned possible implementation mode thereof, in a possible implementation mode of the second aspect, the operation that the terminal device receives the second indication information sent by the network device at a time position after the at least one candidate time position on the carrier of the licensed band may include the following operation.

The terminal device receives the second indication information sent by the network device at a time position after the at least one candidate time position on the carrier corresponding to the primary cell in the licensed band.

The carrier in the unlicensed band may be the carrier corresponding to the secondary cell of the network device in the band.

In combination with the second aspect or any abovementioned possible implementation mode thereof, in a possible implementation mode of the second aspect, the operation that the terminal device performs signal reception on the carrier of the unlicensed band based on the M candidate time positions may include the following operation.

The terminal device periodically performs signal reception on the carrier of the unlicensed band based on the M candidate time positions according to the sending cycle.

In combination with the second aspect or any abovementioned possible implementation mode thereof, in a possible implementation mode of the second aspect, the method may further include the following operation.

The terminal device performs rate matching for a channel or signal different from the SS block based on a hypothesis that the M candidate time positions are occupied by the SS block.

A third aspect provides a network device, which is configured to execute the method in the first aspect or any possible implementation mode of the first aspect. Specifically, the network device includes functional modules configured to execute the method in the first aspect or any possible implementation mode of the first aspect.

A fourth aspect provides a terminal device, which is configured to execute the method in the second aspect or any possible implementation mode of the second aspect. Specifically, the terminal device includes functional modules configured to execute the method in the second aspect or any possible implementation mode of the second aspect.

A fifth aspect provides a network device, which includes a processor, a memory and a transceiver. The processor, the memory and the transceiver communicate with one another through an internal connecting path to transmit control and/or data signals to enable the network device to execute the method in the first aspect or any possible implementation mode of the first aspect.

A sixth aspect provides a terminal device, which includes a processor, a memory and a transceiver. The processor, the memory and the transceiver communicate with one another through an internal connecting path to transmit control and/or data signals to enable the terminal device to execute the method in the second aspect or any possible implementation mode of the second aspect.

A seventh aspect provides a computer-readable medium, which is configured to store computer programs, the computer programs including instructions configured to execute the method in the first aspect or any possible implementation mode.

An eighth aspect provides a computer program product including instructions, which runs on a computer to enable the computer to execute the method in each aspect or any possible implementation mode.

The technical solutions of the embodiments of the application may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5th-Generation (5G) system.

Figure 1:
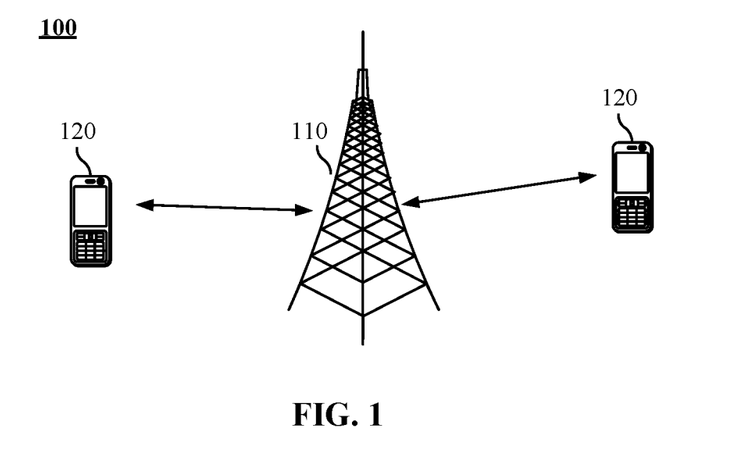
FIG. 1 is a schematic diagram of a wireless communication system according to embodiments of the application.

FIG. 1 illustrates a wireless communication system 100 to which the embodiments of the application are applied. The wireless communication system 100 may include a network device 110. The network device 110 may be a device communicating with a terminal device. The network device 110 may provide communication coverage for a specific geographical region and may communicate with a terminal device (for example, User Equipment (UE)) in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle device, a wearable device, a network-side device in a future 5G network, a network device in a future evolved Public Land Mobile Network (PLMN) or the like.

The wireless communication system 100 further includes at least one terminal device 120 within the coverage of the network device 110. The terminal device 120 may be mobile or fixed. Optionally, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

Optionally, the terminal device 120 may perform Device to Device (D2D) communication.

Optionally, the 5G system or network may also be called an NR system or network.

A network device and two terminal devices are exemplarily shown in FIG. 1. Optionally, the wireless communication system 100 may include multiple network devices and another number of terminal devices may be included in coverage of each network device. There are no limits made thereto in the embodiments of the application.

Optionally, the wireless communication system 100 may further include another network entity such as a network controller and a mobility management entity. There are no limits made thereto in the embodiments of the application.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

An SS block is periodically transmitted. In a cycle for the SS block, an SS burst set of a specific frequency point may be limited in a 5 ms time window, and a maximum SS block number (i.e., candidate time positions of the SS block) is L.

For a frequency-domain range within 3 GHz, L=4.

For a frequency-domain range from 3 GHz to 6 GHz, L=8.

For a frequency-domain range from 6 GHz to 52.6 GHz, L=64.

Figure 2:
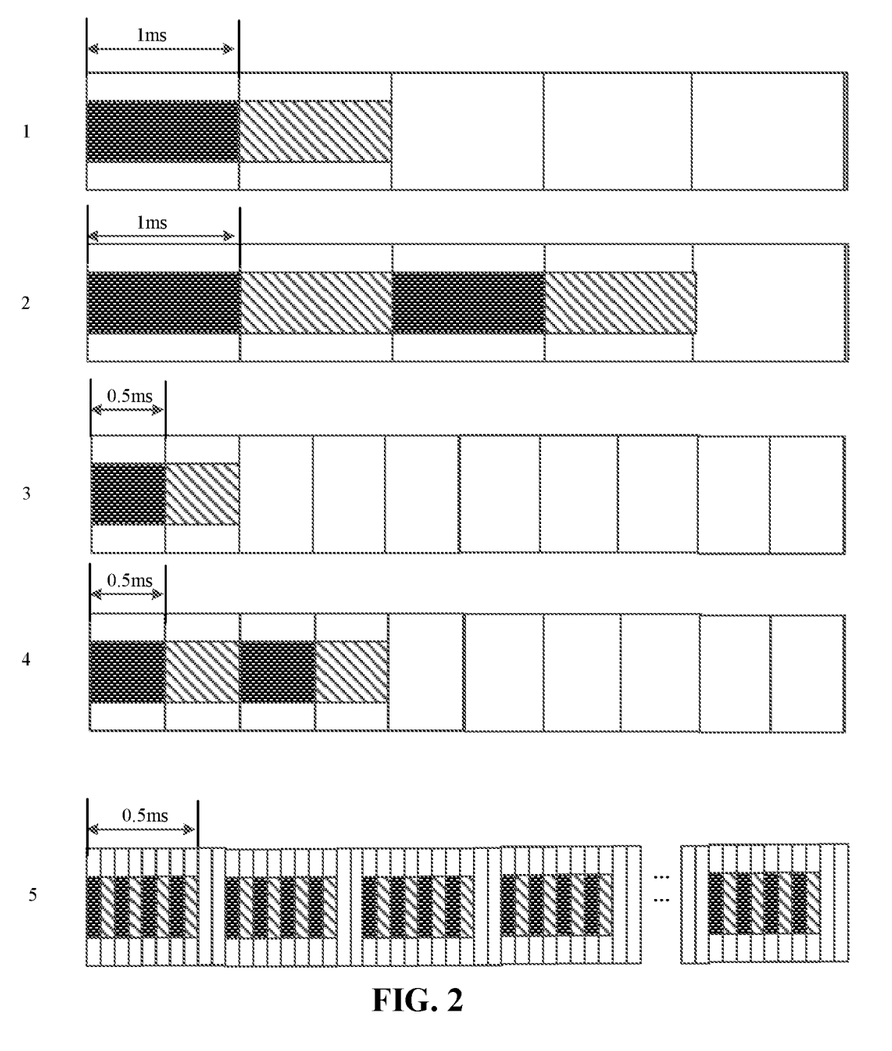
FIG. 2 is a schematic flowchart of SS block distribution according to embodiments of the application.

In the 5 ms time window, for different subcarrier spacings and different working bands, slot distributions of SS blocks may be shown in FIG. 2, the block filled with each line being a slot.

The first row in FIG. 2 shows a slot distribution of the SS block under the condition that the subcarrier spacing is 15 KHZ and L=4. The second row in FIG. 2 shows a slot distribution of the SS block under the condition that the subcarrier spacing is 15 KHZ and L=8. The third row in FIG. 2 shows a slot distribution of the SS block under the condition that the subcarrier spacing is 30 KHZ and L=4. The fourth row in FIG. 2 shows a slot distribution of the SS block under the condition that the subcarrier spacing is 30 KHZ and L=8. The fifth row in FIG. 2 shows a slot distribution of the SS block under the condition that the subcarrier spacing is 240 KHZ and L=64.

Figure 3:
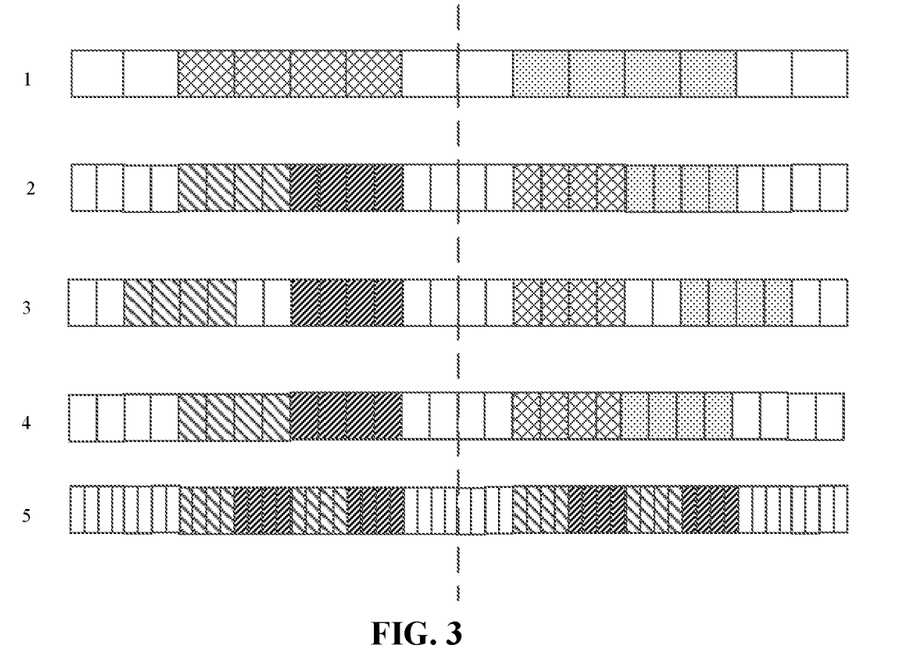
FIG. 3 is a schematic flowchart of SS block distribution according to embodiments of the application.

FIG. 3 shows pattern distributions of the SS block in a slot under subcarrier spacings 15 KHZ, 30 KHZ, 120 KHZ and 240 KHZ. In FIG. 3, each block may represent a symbol (which may also be called a time-domain symbol, a symbol position or a time-domain symbol position, etc.), the first block in each row represents a first symbol of a slot, and 14 continuous symbols form a slot. Four continuous symbols filled with the same line may be considered as a candidate time position for the SS block.

The first row in FIG. 3 shows the pattern distribution of the SS block in the slot under the condition that the subcarrier spacing is 15 KHZ. The second and third rows in FIG. 3 show the pattern distributions of the SS block in the slot under the condition that the subcarrier spacing is 30 KHZ. The fourth row in FIG. 3 shows the pattern distribution of the SS block in the slot under the condition that the subcarrier spacing is 120 KHZ. The fifth row in FIG. 3 shows the pattern distribution of the SS block in the slot under the condition that the subcarrier spacing is 240 KHZ.

As shown in FIG. 3, under the condition that the subcarrier spacings are 15 KHZ and 30 KHZ, at least one or two symbols for downlink control are reserved at the start of the 14 symbols, and at least two symbols for, for example, a guard interval or uplink control, are reserved at the end.

Under the condition that the subcarrier spacing is 120 KHZ, at least two symbols for downlink control are reserved at the start of the 14 symbols, and at least two symbols for, for example, the guard interval or uplink control, are reserved at the end.

Under the condition that the subcarrier spacing is 240 KHZ, across two continuous slots, at least four symbols for downlink control are reserved at the start of the first slot, and at least four symbols for, for example, the guard interval or uplink control, are reserved at the end of the second slot.

In a licensed band, a network device may indicate specific one or more candidate time positions, where the network device is intended to send an SS block to a terminal device, in L candidate time positions in advance to the terminal device.

In an unlicensed band, Carrier Sense Multiple Access/Collision Detection (CSMA/CD) and Carrier Sense Multiple Access/Collision Avoidance (CSMA/CA) may be adopted. A transmission node, before transmitting a wireless signal, may monitor a channel by use of a Listen Before Talk (LBT) mechanism to judge whether the channel is idle.

In the unlicensed band, the network device, if it is needed to send a signal to the terminal device, needs to monitor a carrier of the unlicensed band. During specific implementation, the network device, before monitoring, may generate a random number at first, and if it is always detected that the carrier is idle in a time range corresponding to the generated random number, may send the signal.

Therefore, when the SS block is sent in the unlicensed band, if the network device indicates to the terminal device in advance that the specific one or more candidate time positions where the network device is intended to send the SS block to the terminal, the specific candidate time position corresponding to a specific sending beam, and if the network device may not preempt the pre-specified candidate time position, the SS block may not be sent by use of the specific sending beam, and the terminal device may not receive the SS block sent by the specific sending beam at the candidate time position pre-specified by the network device and consequently may not implement synchronization, measurement over the specific beam and the like. Therefore, the embodiments of the application provide the following method 200 shown in FIG. 4 to solve the problem.

Figure 4:
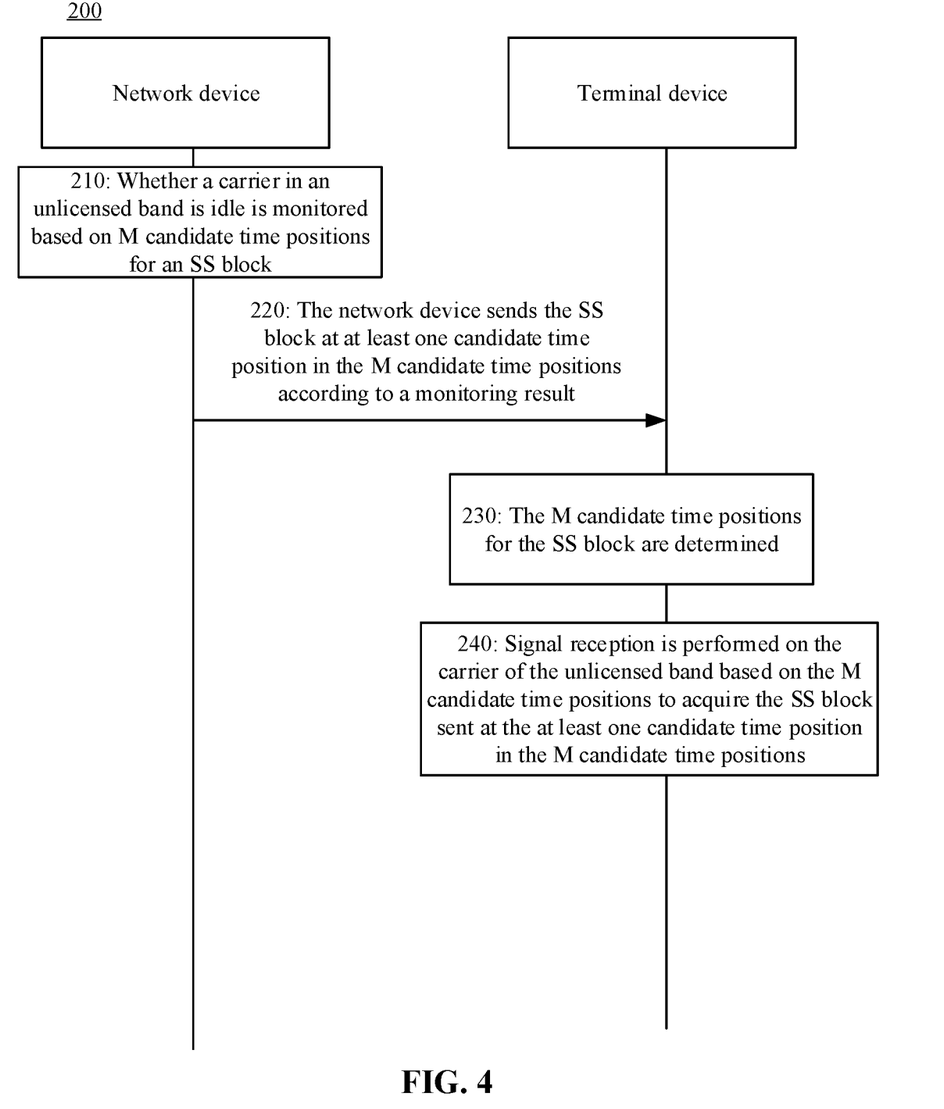
FIG. 4 is a schematic flowchart of a wireless communication method according to embodiments of the application.

FIG. 4 is a schematic flow of a wireless communication method 200 according to embodiments of the application. The method 200 includes at least part of contents in the following contents.

In 210, a network device monitors whether a carrier in an unlicensed band is idle based on M candidate time positions for an SS block, the M candidate time positions being at least part of L candidate time positions of the SS block and the L candidate time positions being all candidate time positions in a single sending cycle of the SS block.

M is an integer more than or equal to 1. When M is greater than 1, the M candidate time positions may be multiple continuous candidate time positions (namely the candidate time positions are not spaced by other candidate time positions, which, however, does not mean they are not spaced by symbols, the symbols being not used for candidate time positions). For example, under the condition that a subcarrier spacing is 15 KHZ and L=4, the M candidate time positions may be two candidate time positions in a slot or may be a second candidate time position of the first slot in two slots and a first candidate time position of the second slot in the two slots.

Or, the M candidate time positions may be multiple discontinuous candidate time positions (namely the candidate time positions may be spaced by other candidate time positions). For example, under the condition that the subcarrier spacing is 15 KHZ and L=4, the M candidate time positions may include a first candidate time position of the first slot in two slots and a first candidate time position of the second slot in the two slots.

Optionally, the network device may sequentially monitors whether the carrier in the unlicensed band is idle before each candidate time position in the M candidate time positions until it is detected that the carrier in the unlicensed band is idle before N candidate time positions or until monitoring of the carrier in the unlicensed band is completed before the last candidate time position in the M candidate time positions, N being the number of candidate time positions where the network device expects to send the SS block and N being a positive integer less than or equal to M.

For example, as shown in FIGS. 2 and 3, under the condition that the subcarrier spacing is 15 KHZ and L=4, if M=2, adjacent candidate time positions are spaced by symbol(s) no matter whether the candidate time positions are continuous or discontinuous, so that, when the carrier may be monitored at the M candidate time positions, the carrier may be monitored before each candidate time position according to a time sequence of the candidate time positions.

It is to be understood that, if there are no spacing symbol between two adjacent candidate time positions in the M candidate time positions (for example, continuous candidate time positions in a slot, as shown in the second, fourth and fifth rows in FIG. 3) and if the SS block is sent at the first candidate time position in the two adjacent candidate time positions, it is not needed to monitor the carrier at the second candidate time position. The description, mentioned in the embodiments of the application, that "the network device may sequentially monitors whether the carrier in the unlicensed band is idle before each candidate time position in the M candidate time positions until it is detected that the carrier in the unlicensed hand is idle before the N candidate time positions or until monitoring of the carrier in the unlicensed band is completed before the last candidate time position in the M candidate time positions" is a condition where universality is considered. The condition that the carrier is not required to be monitored because there are no spacing symbol between two adjacent candidate time positions and the SS block is sent at the first candidate time position also falls within the scope of protection of the description.

It is also to be understood that, if there are spacing symbol between two adjacent candidate time positions (for example, candidate time positions between adjacent slots or adjacent candidate time positions spaced by a symbol in the slot shown in FIG. 3) in the M candidate time positions, and if the SS block is sent at the first candidate time position in the two adjacent candidate time positions and the network device expects to send the SS block at the second candidate time position, an occupancy signal may be sent at the spacing symbol.

Whether the network device sends the occupancy signal may be determined according to a specific condition. For example, in case of M continuous candidate time positions, if the network device may send the SS block at the first candidate time position, the carrier may be monitored before the following time positions because the network device may preempt a resource at a high probability. For example, if the network device expects to send the SS block at two candidate time positions and the network device sends a first SS block at the second last candidate time position in the M candidate time positions, the network device may send an occupancy signal between the second last candidate time position and the last candidate time position to ensure that the SS block may be sent at the last candidate time position.

Optionally, when the carrier is monitored before each candidate time position, a first beam direction in which monitored by the network device is consistent with a second beam direction, the second beam direction being an expected sending beam direction for sending the SS block at each of the candidate time positions.

Specifically, the network device, when monitoring the carrier before a certain candidate time position and if expecting to adopt a beam direction A to send the SS block at the candidate time position, may monitor the carrier in the beam direction A.

Figure 5:
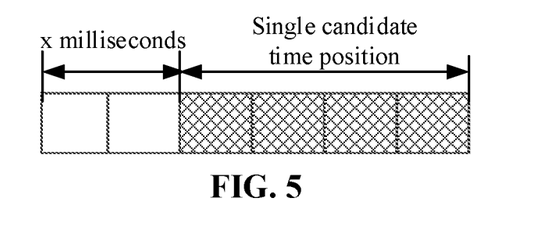
FIG. 5 is a time relationship diagram of a candidate time position and monitoring time according to embodiments of the application.
Figure 6:
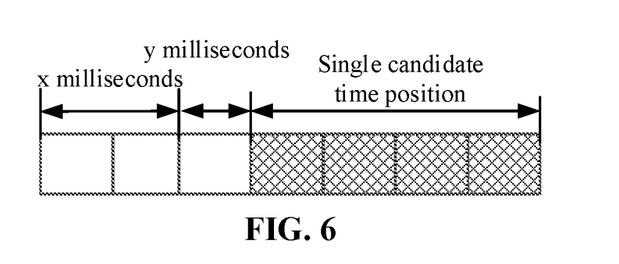
FIG. 6 is a time relationship diagram of a candidate time position and monitoring time according to embodiments of the application.

Optionally, the network device, when monitoring before the candidate time position, may generate a random number at first, a time range corresponding to the random number being x milliseconds. Then, as shown in FIG. 5, monitoring may be performed x milliseconds ahead relative to the candidate time position. This means that the candidate time position is just reached at the end of the x milliseconds. Or, as shown in FIG. 6, monitoring may be performed x+y milliseconds ahead relative to the candidate time position, y milliseconds are left to reach the candidate time position after monitoring is ended, and the occupancy signal may be sent at the y milliseconds.

Optionally, in S220, the network device sends the SS block at at least one of the M candidate time positions according to a monitoring result.

It is to be understood that, if the network device detects that the carrier is idle at the at least one candidate time position in the M candidate time positions, the SS block may be sent at the at least one candidate time position and, if no carrier is detected to be idle in the M candidate time positions, it is not needed to send the SS block in a present sending cycle of the SS block.

Optionally, the network device detects that the carrier in the unlicensed band is idle before each candidate time position in the at least one candidate time position.

Of course, as mentioned above, an occupancy symbol may also be sent at a symbol between two candidate time positions under the condition that the SS block is sent at the first candidate time position to ensure that the SS block may be sent at the second candidate time position. Elaborations are omitted herein.

Optionally, when there are multiple candidate time positions where the SS block is practically sent, different sending beams are adopted for sending the SS block at any two of the multiple candidate time positions.

Optionally, N mentioned in the embodiments of the application represents the number of candidate time positions where the network device expects to send the SS block, and a value of N may be related to the number of beams that the network device expects to send.

For example, if the network device needs to send two beams to cover the whole cell, the value of N may be 2.

In 230, a terminal device determines the M candidate time positions of the SS block.

In 240, the terminal device performs signal reception on the carrier of the unlicensed band based on the M candidate time positions.

Optionally, detection is performed for the SS block sequentially at each candidate time position in the M candidate time positions on the carrier of the unlicensed band until the SS block is acquired at the N candidate time positions or until the SS block is detected at the last candidate time position in the M candidate time positions.

Optionally, the network device periodically monitors the carrier in the unlicensed band according to the sending cycle of the SS block and according to the M candidate time positions.

Correspondingly, the terminal device periodically performs signal reception on the carrier of the unlicensed band based on the M candidate time positions according to the sending cycle.

Optionally, the network device performs rate matching for a channel or signal different from the SS block based on a hypothesis that the M candidate time positions are occupied by the SS block.

Correspondingly, the terminal device performs rate matching for the channel or signal different from the SS block based on a hypothesis that the M candidate time positions are occupied by the SS block.

Specifically, since the M candidate time positions are possible positions that may be configured to send a PSS block in the unlicensed band, the network device and the terminal device, when performing rate matching in the unlicensed band, may perform rate matching for another channel or signal based on a hypothesis that the M candidate time positions are occupied by the SS block. Therefore, correct rate matching may be implemented.

Optionally, the network device sends first indication information, the first indication information being configured to indicate the M candidate time positions or the value of M and/or indicate the value of N, N being the number of the candidate time positions where the network device expects to send the SS block and N being a positive integer less than or equal to M.

Specifically, the network device may indicate the M candidate time positions to the terminal device through the first indication information, and then the terminal device may acquire the M candidate time positions based on the first indication information and detect the SS block at the M candidate time positions.

Or, the network device may indicate the value of M to the terminal device through the first indication information, and then the terminal device may acquire the value of M based on the first indication information. For specific M, specific occupation of the candidate time positions in a time domain may be preset in the terminal device.

Or, the network device may indicate the value of N to the terminal device through the first indication information, and then the terminal device may acquire the value of N based on the first indication information. The network device may indicate both the value of M and the value of N or indicate both the M candidate time positions and the value of N through the first indication information.

Optionally, the first indication information may be carried in RMSI; or, the first indication information is carried in RRC signaling. Of course, the first indication information may also be carried in another signal or channel. There are no specific limits made thereto in the embodiment of the application.

Optionally, the network device sends the first indication information through the carrier in the unlicensed band. Correspondingly, the terminal device receives the first indication information sent by the network device on the carrier in the unlicensed band.

Optionally, the network device sends the first indication information through a carrier in a licensed band. Correspondingly, the terminal device receives the first indication information sent by the network device on the carrier in the licensed band.

Optionally, the network device sends the first indication information by use of a carrier corresponding to a primary cell in the licensed band, the carrier in the unlicensed band being a carrier corresponding to a secondary cell of the network device in the hand. Correspondingly, the terminal device receives the first indication information sent by the network device on the carrier corresponding to the primary cell in the licensed band.

Optionally, the network device sends second indication information at a time position after the at least one candidate time position, the second indication information being configured to indicate a pattern of candidate time position(s) where the SS block is practically sent or the number of the candidate time position(s) where the SS block is practically sent. Correspondingly, the terminal device receives the second indication information sent by the network device at a time position after the at least one candidate time position.

Specifically, due to performance of the unlicensed band, the network device may acquire the number or pattern of the SS block(s) that is practically sent after monitoring the carrier and practically sending the SS block(s) at the at least one candidate time position. Then, the network device may indicate the number and pattern of the SS block(s) that is/are practically sent to the terminal device at a time position after the at least one candidate time position. The terminal device may cache signals received at the M candidate time positions at first and, after receiving an indication of the network device, acquire the SS block(s) from the cached signals.

Optionally, the second indication information indicates, by indicating whether the SS block is sent at each candidate time position in the M candidate time positions, the pattern of the candidate time position where the SS block is practically sent. For example, if the value of M is 4, the terminal device may indicate the number of PSS block(s) that is/are practically sent in a bit mapping manner. For example, if a bit value of the second indication information is 1100, it is indicated that, in four candidate time positions, a PSS is sent at the first and second candidate time positions and no PSS is sent at the third and fourth candidate time positions.

Optionally, the second indication information is configured to indicate the pattern of the candidate time position(s) where the SS block is practically sent. Each of the at least one candidate time position corresponds to a respective one of at least one sending beam according to an arrangement sequence. In other words, each candidate time position in the at least one candidate time position corresponds to a specific beam for the SS block according to the arrangement sequence in the at least one candidate time position. The terminal device determines, according to a time sequence of the at least one candidate time position where the SS block is practically sent, the sending beam adopted by the network device to send the SS block at each candidate time position in the at least one candidate time position.

Specifically, it is needed for the terminal device to acquire the sending beam for the received SS block under some conditions, and then the network device, when sending the SS block at the at least one candidate time position, makes each candidate time position corresponding to a sending beam according to the time sequence, the sending beam corresponding to the candidate time position one to one, so that the terminal device may determine the sending beam for each SS block according to the candidate time position where the received SS block is.

For example, sending beams A, B, C and D needs to correspond to candidate time positions arranged according to a time sequence, and if the network device practically sends the SS block at the second and third candidate time positions in L, the sending beam corresponding to the second candidate time position is A and the sending beam corresponding to the third candidate time position is B.

Optionally, the sending beam through which the terminal device acquires the SS block may be configured for measurement, for example, mobility measurement (for example, Radio Resource Management (RRM) and Radio Link Monitoring (RLM) or beam management related measurement.

Each measurement cycle may include at least one sending beam, and the terminal device may average measurement results of SS blocks that the same sending beam is adopted for in the at least one sending cycle.

Optionally, the network device sends the second indication information through the carrier in the unlicensed band at a time position after the at least one candidate time position. Correspondingly, the terminal device receives, the second indication information sent by the network device at the time position after the at least one candidate time position, on the carrier of the unlicensed band.

Optionally, the network device sends the second indication information through the carrier in the licensed band at a time position after the at least one candidate time position. Correspondingly, the terminal device receives, on the carrier of the licensed band, the second indication information which is sent by the network device at a time position after the at least one candidate time position.

Optionally, the network device sends the second indication information by use of the carrier corresponding to the primary cell in the licensed hand, the carrier in the unlicensed band being the carrier corresponding to the secondary cell of the network device in the band. Correspondingly, the terminal device receives, on the carrier corresponding to the primary cell in the licensed band, the second indication information which is sent by the network device at a time position after the at least one candidate time position.

Optionally, the second indication information may be carried in physical-layer signaling, and for example, may be carried in Downlink Control Information (DCI).

Therefore, in the embodiments of the application, the network device monitors whether the carrier in the unlicensed band is idle based on the M candidate time positions in the L candidate time positions of the SS block and sends the SS block at the at least one candidate time position in the M candidate time positions according to the monitoring result, and the terminal device may perform signal reception on the carrier of the unlicensed band based on the M candidate time positions to acquire the SS block sent at the at least one candidate time position in the M candidate time positions. In such a manner, the SS block is not required to be transmitted at a fixed candidate time position, and transmission of the SS block on the carrier of the unlicensed band may be implemented.

Figure 7:
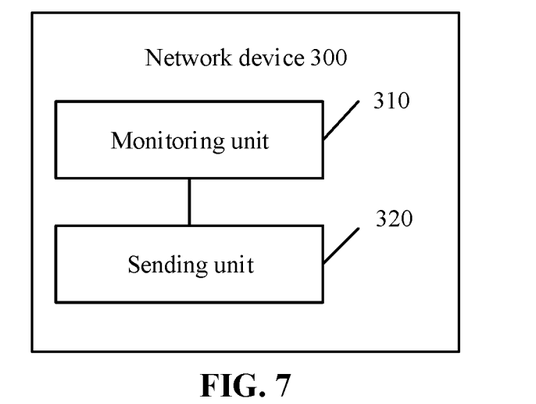
FIG. 7 is a schematic block diagram of a network device according to embodiments of the application.

FIG. 7 is a schematic block diagram of a network device 300 according to embodiments of the application. The network device 300 includes a monitoring unit 310, and optionally includes a sending unit 320.

The monitoring unit 310 is configured to monitor whether a carrier in an unlicensed band is idle based on M candidate time positions for an SS block, the M candidate time positions being at least part of L candidate time positions of the SS block and the L candidate time positions being all candidate time positions in a single sending cycle of the SS block. The sending unit 320 is configured to send the SS block at at least one candidate time position in the M candidate time positions according to a monitoring result.

It is to be understood that the network device 300 may correspond to the network device in the method embodiments, may implement corresponding operations implemented by the network device in the method embodiments and, for simplicity, will not be elaborated herein.

Figure 8:
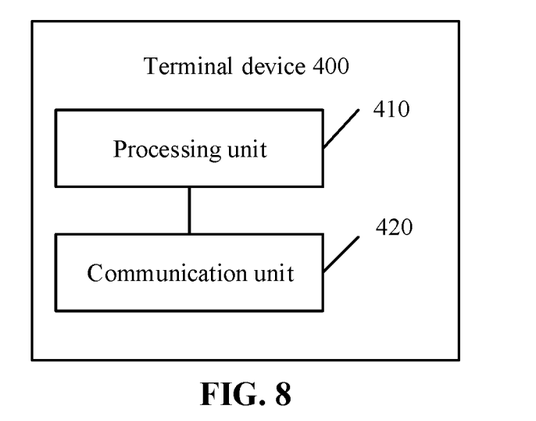
FIG. 8 is a schematic block diagram of a terminal device according to embodiments of the application.

FIG. 8 is a schematic block diagram of a terminal device 400 according to embodiments of the application. The terminal device 400 includes a processing unit 410 and a communication unit 420.

The processing unit 410 is configured to determine M candidate time positions for an SS block, the M candidate time positions being at least part of L candidate time positions of the SS block and the L candidate time positions being all candidate time positions in a single sending cycle of the SS block. The communication unit 420 is configured to perform signal reception on a carrier of an unlicensed band based on the M candidate time positions to acquire the SS block.

It is to be understood that the terminal device 400 may correspond to the terminal device in the method embodiments, may implement corresponding operations implemented by the terminal device in the method embodiments and, for simplicity, will not be elaborated herein.

Figure 9:
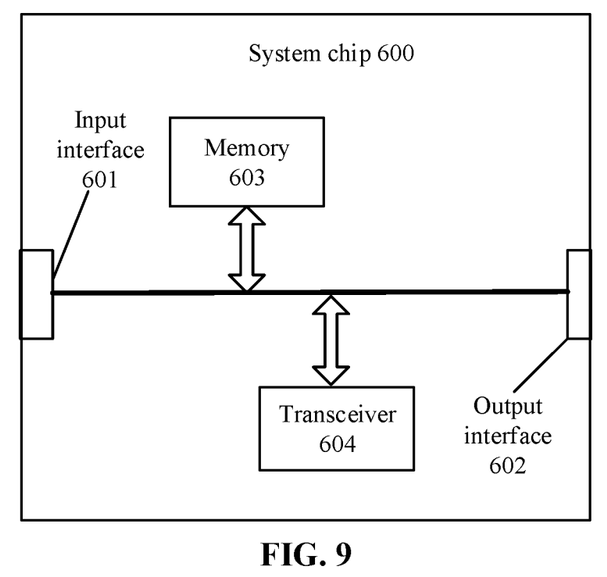
FIG. 9 is a schematic block diagram of a system chip according to embodiments of the application.

FIG. 9 is a schematic structure diagram of a system chip 600 according to embodiments of the application. The system chip 600 of FIG. 9 includes an input interface 601, output interface 602, processor 603 and memory 604 which may be connected through an internal communication connecting line. The processor 603 is configured to execute codes in the memory 604.

Optionally, when the codes are executed, the processor 603 implements the method executed by the terminal device in the method embodiments. For simplicity, elaborations are omitted herein.

Optionally, when the codes are executed, the processor 603 implements the method executed by the network device in the method embodiments. For simplicity, elaborations are omitted herein.

Figure 10:
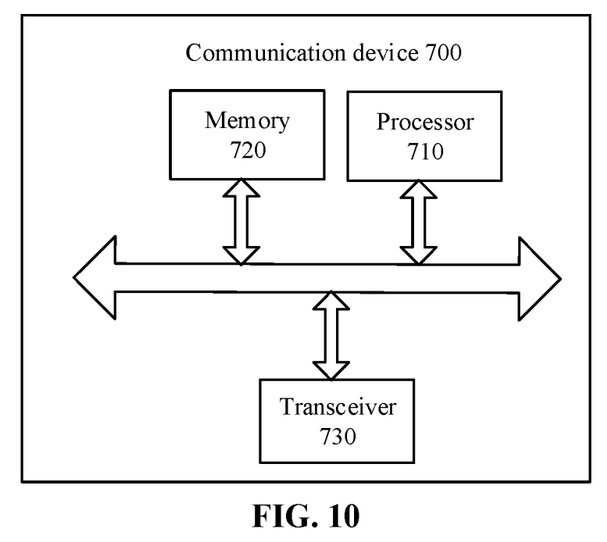
FIG. 10 is a schematic block diagram of a communication device according to embodiments of the application.

FIG. 10 is a schematic block diagram of a communication device 700 according to embodiments of the application. As shown in FIG. 10, the communication device 700 includes a processor 710 and a memory 720. Herein, the memory 720 may store program codes, and the processor 710 may execute the program codes stored in the memory 720.

Optionally, as shown in FIG. 10, the communication device 700 may include a transceiver 730, and the processor 710 may control the transceiver 730 for external communication.

Optionally, the processor 710 may call the program codes stored in the memory 720 to execute corresponding operations of the terminal device in the method embodiments. For similarity, elaborations will be omitted herein.

Optionally, the processor 710 may call the program codes stored in the memory 720 to execute corresponding operations of the network device in the method embodiments. For similarity, elaborations will be omitted herein.

It is to be understood that the processor in the embodiments of the application may be an integrated circuit chip and has a signal processing capability. In an implementation process, each operation of the method embodiment may be completed by an integrated logical circuit of hardware in the processor or instructions in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the application may be implemented or executed. The universal processor may be a microprocessor or the processor may also be any conventional processor and the like. The operations of the method disclosed in combination with the embodiments of the application may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiments of the application may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM) and a Direct Rambus RAM (DR RAM). It is to be noted that the memory of a system and method described in the disclosure is intended to include, but not limited to, memories of these and any other proper types.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiments and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the application. The abovementioned storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A wireless communication method, comprising:
monitoring, by a network device only based on M candidate time positions for a Synchronization Signal block (SSB), whether a carrier in an unlicensed band is idle, wherein the M candidate time positions comprise candidate time positions where a monitoring result indicates that the carrier is idle and candidate time positions where the monitoring result indicates that the carrier is not idle, the SSB is sent only on the candidate time positions where the monitoring result indicates that the carrier is idle, the M candidate time positions are at least part of L candidate time positions of the SS block, and the L candidate time positions are all candidate time positions in a single sending cycle of the SS block; and
sending, by the network device, first indication information through the carrier in the unlicensed band, the first indication information being configured to indicate:
the M candidate time positions or a value of M; and
a value of N, N being a number of beams that the network device expects to send and N being a positive integer less than or equal to M, wherein the method further comprises:
sending an occupancy signal between two adjacent candidate time positions of the M candidate time positions for transmission of the SSB.

2. The method of claim 1, further comprising:
sending, by the network device, second indication information at a time position after at least one candidate time position of the M candidate time positions,
the second indication information being configured to indicate a pattern of one or more candidate time positions where the SS block is actually sent or a number of the one or more candidate time positions where the SS block is actually sent.

3. The method of claim 2, wherein the second indication information is configured to indicate the pattern of the one or more candidate time positions where the SS block is actually sent; and
each of the at least one candidate time position corresponds to a respective one of at least one sending beam according to an arrangement sequence.

4. The method of claim 2, wherein sending, by the network device, the second indication information at a time position after the at least one candidate time position comprises:
sending, by the network device through the carrier in the unlicensed band, the second indication information at a time position after the at least one candidate time position.

5. A wireless communication method, comprising:
determining, by a terminal device, M candidate time positions for a Synchronization Signal (SS) block, wherein the M candidate time positions comprise candidate time positions where a monitoring result obtained by a network device indicates that a carrier of an unlicensed band is idle and candidate time positions where the monitoring result indicates that the carrier is not idle, the SSB is sent only on the candidate time positions where the monitoring result indicates that the carrier is idle, the M candidate time positions are at least part of L candidate time positions of the SS block, and the L candidate time positions are all candidate time positions in a single sending period of the SS block;
performing, by the terminal device only based on the M candidate time positions, signal reception on the carrier to acquire the SS block; and
receiving, by the terminal device on the carrier in the unlicensed band, first indication information sent by the network device, the first indication information being configured to indicate:
the M candidate time positions or a value of M; and
a value of N, N being a number of beams that the network device expects to send and N being a positive integer less than or equal to M,
wherein the method further comprises:
receiving an occupancy signal between two adjacent candidate time positions of the M candidate time positions for transmission of the SSB.

6. The method of claim 5, wherein performing, by the terminal device based on the M candidate time positions, signal reception on the carrier of the unlicensed band comprises:
sequentially performing a detection for the SS block at each candidate time position in the M candidate time positions on the carrier of the unlicensed band until the SS block is acquired at N candidate time positions or until the detection for the SS block is performed at the last candidate time position in the M candidate time positions, N being a number of candidate time positions where a network device expects to send the SS block and N being a positive integer less than or equal to M.

7. The method according to claim 5, further comprising:
receiving, by the terminal device, second indication information sent by the network device at a time position after at least one candidate time position, the at least one candidate time position being at least one candidate time position where the SS block is actually sent,
the second indication information comprising a pattern of the at least one candidate time position where the SS block is actually sent or the number of the at least one candidate time position where the SS block is actually sent.

8. The method of claim 7, wherein the second indication information is configured to indicate a pattern of the at least one candidate time position where the SS block is actually sent, and each of the at least one candidate time position corresponds to a respective one of at least one sending beam according to an arrangement sequence; and
the method further comprises:
determining, by the terminal device according to a time sequence of the at least one candidate time position where the SS block is practically sent, a sending beam adopted by the network device to send the SS block at each candidate time position in the at least one candidate time position.

9. The method of claim 7, wherein receiving, by the terminal device, the second indication information sent by the network device at a time position after the at least one candidate time position comprises:
receiving, by the terminal device, the second indication information sent by the network device at a time position after the at least one candidate time position on the carrier of the unlicensed band.

10. The method of claim 7, wherein receiving, by the terminal device, the second indication information sent by the network device at a time position after the at least one candidate time position comprises:
receiving, by the terminal device, the second indication information sent by the network device at a time position after the at least one candidate time position on a carrier of a licensed band.

11. A network device, comprising a processor and a transceiver, wherein
the processor is configured to monitor, only based on M candidate time positions for a Synchronization Signal (SS) block, whether a carrier in an unlicensed band is idle, wherein the M candidate time positions comprise candidate time positions where a monitoring result indicates that the carrier is idle and candidate time positions where the monitoring result indicates that the carrier is not idle, the SSB is sent only on the candidate time positions where the monitoring result indicates that the carrier is idle, the M candidate time positions are at least part of L candidate time positions of the SS block, and the L candidate time positions are all candidate time positions in a single sending cycle of the SS block; and
the transceiver is further configured to send first indication information through the carrier in the unlicensed band, the first indication information being configured to indicate:

the M candidate time positions or a value of M; and a value of N, N being a number of beams that the network device expects to send and N being a positive integer less than or equal to M, wherein the processor is further configured to send an occupancy signal between two adjacent candidate time positions of the M candidate time positions for transmission of the SSB.

12. The device of claim 11, wherein the processor is further configured to:

sequentially monitor, before each candidate time position in the M candidate time positions, whether the carrier in the unlicensed band is idle until it is detected that the carrier in the unlicensed band is idle before N candidate time positions or until monitoring of the carrier in the unlicensed band is completed before a last candidate time position in the M candidate time positions, N being a number of candidate time positions where the network device expects to send the SS block and N being a positive integer less than or equal to M.

13. The device of claim 11, wherein the transceiver is configured to:

send second indication information at a time position after at least one candidate time position of the M candidate time positions, the second indication information being configured to indicate a pattern of one or more candidate time positions where the SS block is actually sent or a number of the one or more candidate time positions where the SS block is actually sent.

14. The device of claim 13, wherein the transceiver is further configured to:

send, through a carrier in a licensed band, the second indication information at a time position after the at least one candidate time position.

15. The device of claim 14, wherein the transceiver is further configured to:

send the second indication information by use of a carrier corresponding to the primary cell in the licensed band, the carrier in the unlicensed band being a carrier corresponding to the secondary cell of the network device in a band.

16. A terminal device, comprising a processor and a transceiver, wherein the processor is configured to determine M candidate time positions for a Synchronization Signal (SS) block, wherein the M candidate time positions comprise candidate time positions where a monitoring result obtained by a network device indicates that a carrier of an unlicensed band is idle and candidate time positions where the monitoring result indicates that the carrier is not idle, the SSB is sent only on the candidate time positions where the monitoring result indicates that the carrier is idle, the M candidate time positions are at least part of L candidate time positions of the SS block, and the L candidate time positions are all candidate time positions in a single sending cycle of the SS block;

the transceiver is configured to perform, only based on the M candidate time positions, signal reception on the carrier to acquire the SS block; and the transceiver is further configured to receive first indication information sent by the network device on the carrier in the unlicensed band, the first indication information being configured to indicate:

the M candidate time positions or a value of M; and/or a value of N, N being a number of beams that the network device expects to send and N being a positive integer less than or equal to M, wherein the processor is further configured to receive an occupancy signal between two adjacent candidate time positions of the M candidate time positions for transmission of the SSB.

17. The device of claim 16, wherein the transceiver is further configured to:

sequentially perform a detection for the SS block at each candidate time position in the M candidate time positions on the carrier of the unlicensed band until the SS block is acquired at N candidate time positions or until the detection for the SS block is performed at the last candidate time position in the M candidate time positions, N being a number of candidate time positions where a network device expects to send the SS block and N being a positive integer less than or equal to M.

18. The device of claim 16, wherein the transceiver is further configured to:

receive second indication information sent by the network device at a time position after at least one candidate time position, the at least one candidate time position being at least one candidate time position where the SS block is actually sent, the second indication information comprising a pattern of the at least one candidate time position where the SS block is actually sent or the number of the at least one candidate time position where the SS block is actually sent.

19. The device of claim 18, wherein the transceiver is further configured to:

receive the second indication information sent by the network device at a time position after the at least one candidate time position on a carrier of a licensed band.

20. The device of claim 19, wherein the transceiver is further configured to:

receive the second indication information sent by the network device at a time position after the at least one candidate time position on a carrier corresponding to the primary cell in the licensed band, the carrier in the unlicensed band being a carrier corresponding to the secondary cell of the network device in a band.

* * * * *